US007657086B2

(12) United States Patent
Gu (10) Patent No.: US 7,657,086 B2
(45) Date of Patent: Feb. 2, 2010

(54) METHOD AND APPARATUS FOR AUTOMATIC EYEGLASSES DETECTION USING A NOSE RIDGE MASK

(75) Inventor: Kunlong Gu, Sunnyvale, CA (US)

(73) Assignee: Fujifilm Corporation, Tokyo (JP)

( * ) Notice: Subject to any disclaimer, the term of this patent is extended or adjusted under 35 U.S.C. 154(b) by 496 days.

(21) Appl. No.: 11/342,588

(22) Filed: Jan. 31, 2006

(65) Prior Publication Data

US 2007/0177794 A1 Aug. 2, 2007

(51) Int. Cl.
*G06K 9/62* (2006.01)
*G06K 9/46* (2006.01)
*G06K 9/66* (2006.01)

(52) U.S. Cl. ........................ 382/159; 382/190; 382/228; 382/118

(58) Field of Classification Search ................. 382/224, 382/228, 181, 159, 160, 118, 190, 117
See application file for complete search history.

(56) References Cited

U.S. PATENT DOCUMENTS 6,714,665 B1 * 3/2004 Hanna et al. ................ 382/117
2005/0105780 A1 5/2005 Ioffe
2005/0190963 A1 9/2005 Li

OTHER PUBLICATIONS

Zhong Jing and Robert Mariani, "Glasses Detection and Extraction by Deformable Contour" In Proc 15th International Conference on Pattern Recognition, Sep. 2000, pp. 933-936.*
AZ Kouzani, "A Fuzzy Neural Network For Extracting Facial Patterns" IEEE XIII Workshop on Neural Networks for Signal Processing, 2003, pp. 699-708.*
Saito et al. "Estimation of Eyeglassless Facial Images Using Principal Component Analysis." ICIP 99, Proceedings of the 1999 International Conference on Image Processing, vol. 4, Oct. 24-28, 1999, pp. 197-201.*
Wu et al., "Automatic Eyeglasses Removal from Face Images", IEEE Transactions on Pattern Analysis and Machine Intelligence, vol. 26, No. 3, Mar. 2004.

* cited by examiner

*Primary Examiner*—Jon Chang
(74) *Attorney, Agent, or Firm*—Birch, Stewart, Kolasch & Birch, LLP

(57) ABSTRACT

A method and an apparatus automatically detect eyeglasses in an image. The method according to one embodiment accesses digital image data representing an image including a face; detects eyeglasses in the image by using nose ridge masking; and outputs a decision about presence or absence of eyeglasses in the image.

18 Claims, 7 Drawing Sheets

METHOD AND APPARATUS FOR AUTOMATIC EYEGLASSES DETECTION USING A NOSE RIDGE MASK

CROSS-REFERENCE TO RELATED APPLICATION

This non-provisional application is related to co-pending non-provisional application Ser. No. 11/342,582 titled "Method and Apparatus for Automatic Eyeglasses Detection and Removal" filed concurrently herewith on Jan. 31, 2006, the entire contents of which are hereby incorporated by reference.

BACKGROUND OF THE INVENTION

1. Field of the Invention

The present invention relates to a digital image processing technique, and more particularly to a method and apparatus for detecting eyeglasses in a digital image.

2. Description of the Related Art

Face recognition plays an important role in digital image processing techniques concerned with the study and processing of human faces images. An important requirement for a successful face recognition system is its robustness against occlusions appearing in face images. Eyeglasses are some of the most common objects that occlude faces. Presence of eyeglasses in images can significantly affect the performance of a face recognition system. Variability in lighting conditions in face images poses an additional challenge in eyeglasses and face detection.

A few publications have studied the impact of occluded face regions on face recognition. One such technique is described in U.S. patent application Ser. No. 2005/0190963 A1 entitled "Target Object Detecting Method, Apparatus, and Program". The method described in this work detects faces which pose detection problems due to occlusions such as eyeglasses. This method, however, is concerned with face detection and does not automatically detect eyeglasses in faces. This method also does not address the challenges posed by various lighting conditions in face images.

A disclosed embodiment of the application addresses these and other issues by utilizing a method and apparatus for automatic eyeglasses detection in a face image using a nose ridge mask.

SUMMARY OF THE INVENTION

The present invention is directed to a method and an apparatus for automatically detecting eyeglasses in an image. According to a first aspect of the present invention, a method of automatically detecting eyeglasses in an image comprises: accessing digital image data representing an image including a face; detecting eyeglasses in the image by using nose ridge masking; and outputting a decision about presence or absence of eyeglasses in the image.

According to a second aspect of the present invention, an apparatus for automatically detecting eyeglasses in an image comprises: an image data unit for providing digital image data representing an image including a face; an eyeglasses detection unit for detecting eyeglasses in the image by using a nose ridge mask; and a decision unit for outputting a decision about presence or absence of eyeglasses in the image.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
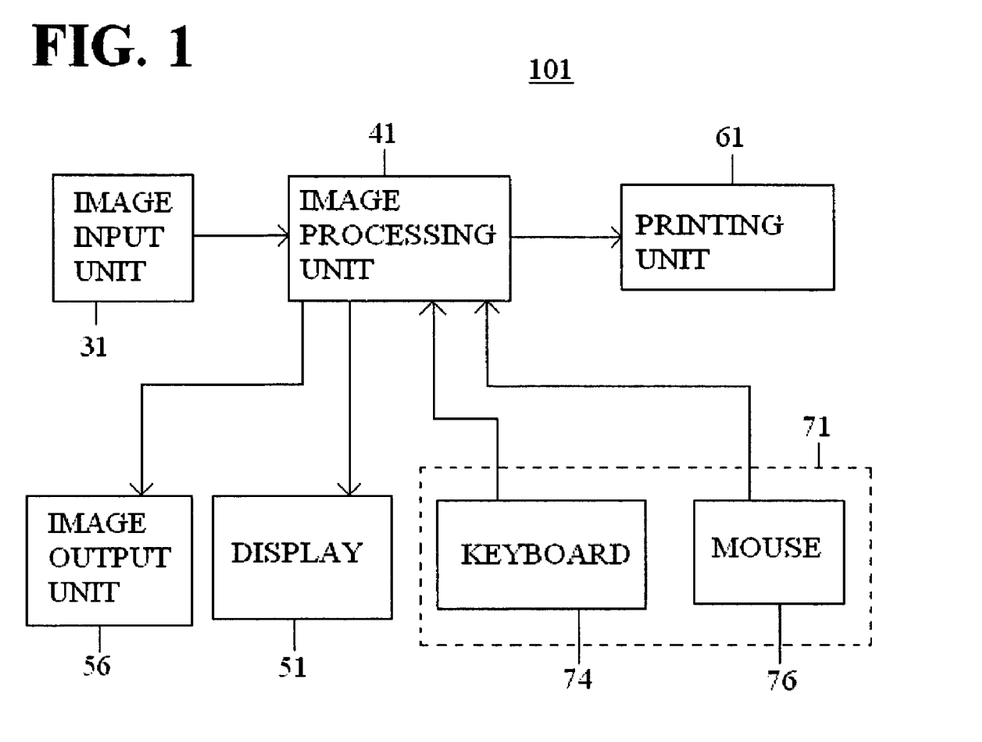
FIG. 1 is a block diagram of a system including an image processing unit for automatic eyeglasses detection using a nose ridge mask according to an embodiment of the present invention.

Aspects of the invention are more specifically set forth in the accompanying description with reference to the appended figures. FIG. 1 is a block diagram of a system including an image processing unit for automatic eyeglasses detection using a nose ridge mask according to an embodiment of the present invention. The system 101 illustrated in FIG. 1 includes the following components: an image input unit 31; an image processing unit 41; a display 51; an image output unit 56; a user input unit 71; and a printing unit 61. Operation of the system 101 in FIG. 1 will become apparent from the following discussion.

The image input unit 31 provides digital image data. The digital image data represents images that include human faces. Image input unit 31 may be one or more of any number of devices providing digital image data, such as: a scanner for scanning black and white or color images recorded on film; a digital camera; a recording medium such as a CD-R, a floppy disk, a USB drive, etc.; a database system which stores images; a network connection; an image processing system that outputs digital data, such as a computer application that processes images; etc.

The image processing unit 41 receives digital image data including face images from the image input unit 31 and performs eyeglasses detection using a nose ridge mask in a manner discussed in detail below. A user may view outputs of image processing unit 41, including intermediate results of eyeglasses detection, via display 51 and may input commands to the image processing unit 41 via the user input unit 71. In the embodiment illustrated in FIG. 1, the user input unit 71 includes a keyboard 74 and a mouse 76. In addition to performing automatic eyeglasses detection in accordance with embodiments of the present invention, the image processing unit 41 may perform additional image processing functions in accordance with commands received from the user input unit 71. The output of image processing unit 41 may be sent to an image output unit 56 that performs further operations on image data for various purposes. The image output unit 56 may be a module that performs further processing of the image data, a database that collects and compares images, etc.

Figure 2:
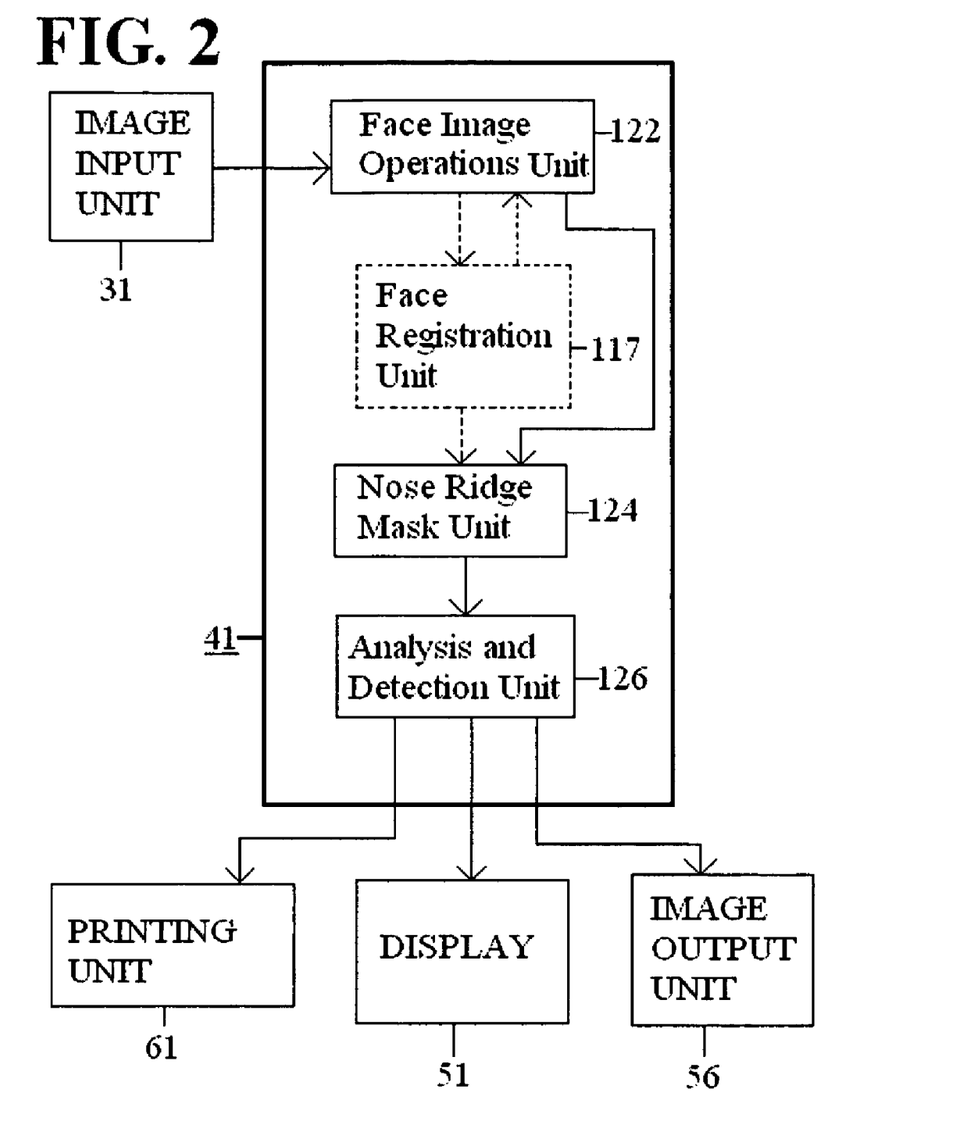
FIG. 2 is a block diagram of an image processing unit for automatic eyeglasses detection using a nose ridge mask according to an embodiment of the present invention illustrated in FIG. 1.

FIG. 2 is a block diagram of an image processing unit 41 for automatic eyeglasses detection using a nose ridge mask according to an embodiment of the present invention illustrated in FIG. 1.

Eyeglasses in face images typically have two distinctive features: frame and lens reflection. Compared to the lens reflection, the frame is more evident and stable over different images. In addition, the frame can be enhanced by edge enhancement filters. Hence, the eyeglasses frame is a potential feature for eyeglasses detection. However, some characteristics of eyeglasses frames, such as thickness and size of lenses, can vary considerably. For these reasons, eyeglasses frames present challenges when used as features for eyeglasses detection.

Since eyeglasses usually appear in the same face region, namely the eye region, detecting eyeglasses is equivalent to detecting a portion of the eyeglasses frame in a smaller fixed region of that face region. The bridge between two lenses, normally on the nose ridge of a person, is a good detection feature, because it is stable across different types of frames. Furthermore, the nose ridge region occupies only a small portion of the original face image. Hence detecting eyeglasses using the nose ridge region reduces the dimension of the original eyeglasses detection problem, and hence, requires fewer amounts of training data.

As shown in FIG. 2, the image processing unit 41 according to this embodiment includes: a face image operations unit 122; a nose ridge mask unit 124; an analysis and detection unit 126; and an optional face registration unit 117. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 41 illustrated in FIG. 2 performs preprocessing of digital image data, training in detection of eyeglasses in digital image data, and detection of eyeglasses. Digital image data from image input unit 31 is sent to face image operations unit 122. Digital image data can be raw images that include faces. Face image operations unit 122 receives digital image data, detects faces in digital image data, extracts face images from digital image data, and performs processing operations on the extracted face images. Processing operations on images may include feature enhancement, resizing, cropping, compression, color correction, etc. Face registration unit 117 can improve eyeglasses detection by performing face registration of the faces in the face images received from face image operations unit 122. Face image operations unit 122 and face registration unit 117 may perform face detection and face registration using methods described in U.S. patent application Ser. No. 10/734,258 filed on Dec. 15, 2003 and titled "Method and Apparatus for Object Recognition Using Probability Models", which is herein incorporated by reference.

Face registration unit 117 sends registered face images back to face image operations unit 122, or to nose ridge mask unit 124. Face image operations unit 122 sends unregistered or registered face images to nose ridge mask unit 124. Nose ridge mask unit 124 detects nose ridge regions in face images. Nose ridge mask unit 124 next sends digital data to analysis and detection unit 126. Analysis and detection unit 126 analyzes image data and detects whether the face images include eyeglasses. The output of analysis and detection unit 126 is a decision on presence or absence of eyeglasses in the face images. Decisions on presence or absence of eyeglasses in face images, together with face images, may be output to image output unit 56, printing unit 61, and/or display 51. Operation of the components included in the image processing unit 41 illustrated in FIG. 2 will be next described with reference to FIGS. 3-7. Face image operations unit 122, nose ridge mask unit 124, analysis and detection unit 126, and face registration unit 117 are software applications.

Figure 3:
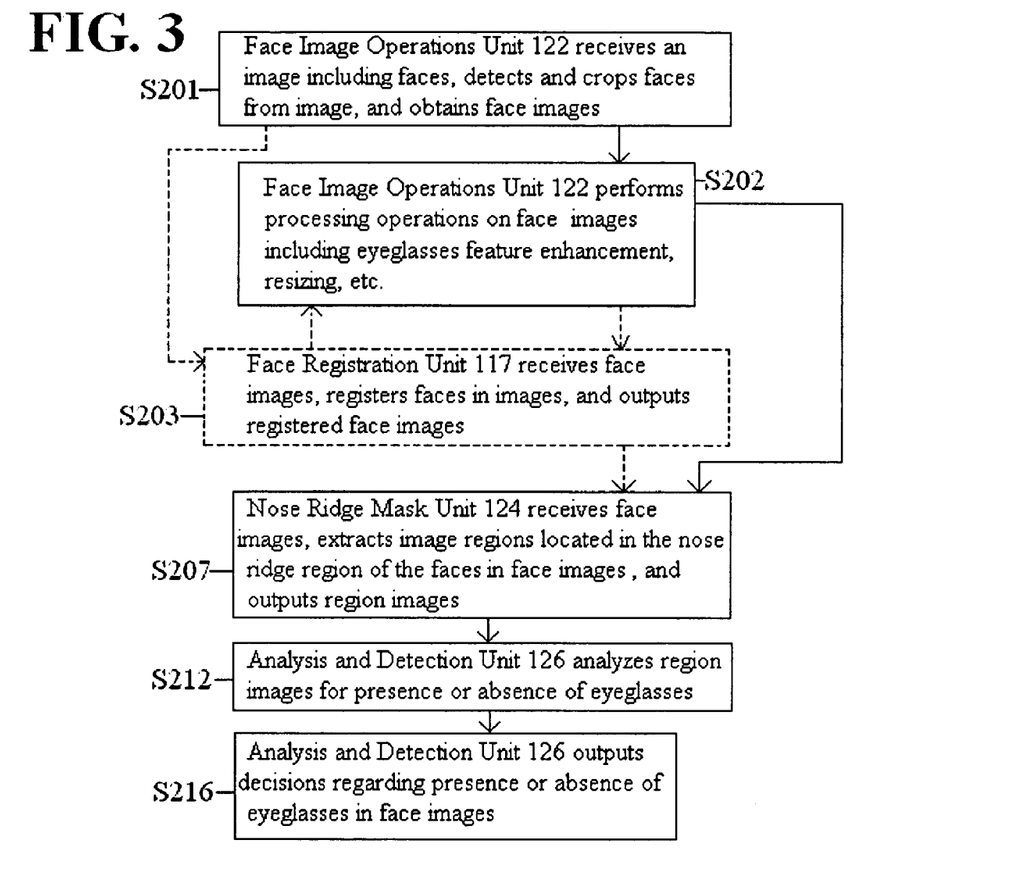
FIG. 3 is a flow diagram illustrating operations performed by an image processing unit for automatic eyeglasses detection using a nose ridge mask according to an embodiment of the present invention illustrated in FIG. 2.

FIG. 3 is a flow diagram illustrating operations performed by an image processing unit 41 for automatic eyeglasses detection using a nose ridge mask according to an embodiment of the present invention illustrated in FIG. 2. Face image operations unit 122 receives an image including faces, detects and crops faces from the image, and outputs face images (S201). Face image operations unit 122 next performs processing operations on face images, including enhancing features related to eyeglasses, resizing, etc. (S202). If the face registration unit 117 is not present, step S207 is performed after step S202. Face registration unit 117, if present, receives the face images from face image operations unit 122, registers the faces, and outputs registered face images (S203). Face registration (step S203) may be performed between steps S201 and S202, or after step S202.

Nose ridge mask unit 124 receives registered or unregistered face images, extracts image regions located in the nose ridge region of the faces in the face images, and outputs region images (S207). Since an image region located in the nose ridge region has significantly less pixels than the whole face, the amount of data processed in and after step S207 is reduced. Also, the bridge located between eyeglasses lenses in the nose ridge region is consistent for different kinds of eyeglasses. Moreover, the nose bridge in an image with eyeglasses exhibits different features than the nose bridge in an image without eyeglasses. Analysis and detection unit 126 analyzes region images for presence or absence of eyeglasses (S212). Finally, analysis and detection unit 126 outputs decisions regarding presence or absence of eyeglasses in face images (S216).

Figure 4:
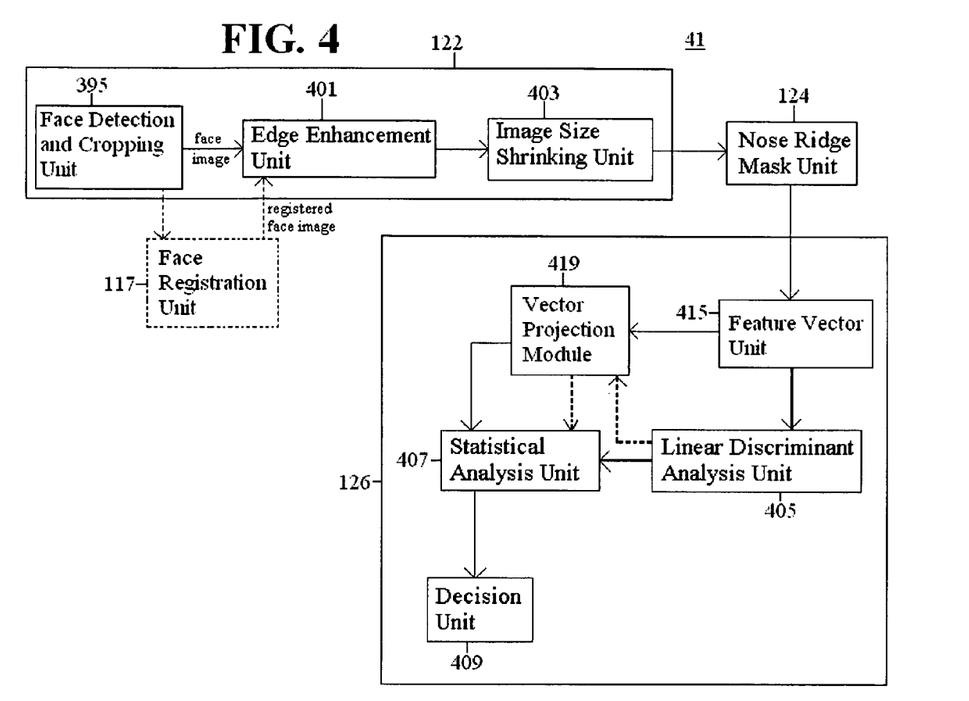
FIG. 4 is a block diagram of an exemplary image processing unit for automatic eyeglasses detection using a nose ridge mask according to an embodiment of the present invention illustrated in FIG. 2.

FIG. 4 is a block diagram of an exemplary image processing unit 41 for automatic eyeglasses detection using a nose ridge mask according to an embodiment of the present invention illustrated in FIG. 2. Image processing unit 41 includes the following components: a face detection and cropping unit 395; an edge enhancement unit 401; an image size shrinking unit 403; an optional face registration unit 117; a nose ridge mask unit 124; a feature vector unit 415; a vector projection module 419; a linear discriminant analysis unit 405; a statistical analysis unit 407; and a decision unit 409. Face detection and cropping unit 395, edge enhancement unit 401 and image size shrinking unit 403 are included in face image operations unit 122. Feature vector unit 415, linear discriminant analysis unit 405, vector projection module 419, statistical analysis unit 407 and decision unit 409 are included in analysis and detection unit 126.

Operation of the image processing unit 41 can generally be divided into two stages: (1) eyeglasses detection learning; and (2) actual detection of eyeglasses. The principles involved in both of these stages for an implementation of the present invention are described in FIGS. 5 and 6.

In both eyeglasses detection learning stage and actual detection of eyeglasses stage, image data passes through edge enhancement unit 401, image size shrinking unit 403, nose ridge mask unit 124 and feature vector unit 415. Face detection and cropping unit 395 crops face images. Edge enhancement unit 401 enhances edges in face images and outputs edge maps. The sizes of the edge maps image are modified by the image size shrinking unit 403. The nose ridge mask unit 124 receives the edge maps from image size shrinking unit 403, and extracts image regions located in the nose ridge region of the faces shown in the edge maps. Feature vector unit 415 extracts feature vectors from the nose ridge image regions output from nose ridge mask unit 124.

The thick arrows, both dotted and continuous, in FIG. 4 describe the flow of data during the eyeglasses detection learning stage. Linear discriminant analysis unit 405 receives feature vectors from feature vector unit 415 and uses linear discriminant analysis to train in detecting eyeglasses. Vector projection module 419 can be used in the learning stage to perform vector projection after linear discriminant analysis unit. Statistical analysis unit 407 receives training analysis results from linear discriminant analysis unit 405 and from vector projection module 419, and stores learned parameters to be used in eyeglasses detection.

During the actual detection of eyeglasses stage, vector projection module 419 performs vector projection using results from the learning stage. Statistical analysis unit 407 next calculates scores for scalars associated feature vectors extracted from nose ridge regions. Decision unit 409 then performs decisions on whether eyeglasses are present or not in face images. Decision unit 409 may output such decisions to image output unit 56, printing unit 61, and/or display 51.

Face detection and cropping unit 395, edge enhancement unit 401, image size shrinking unit 403, face registration unit 117, nose ridge mask unit 124, feature vector unit 415, vector projection module 419, linear discriminant analysis unit 405, statistical analysis unit 407, and decision unit 409 are software applications.

Figure 5:
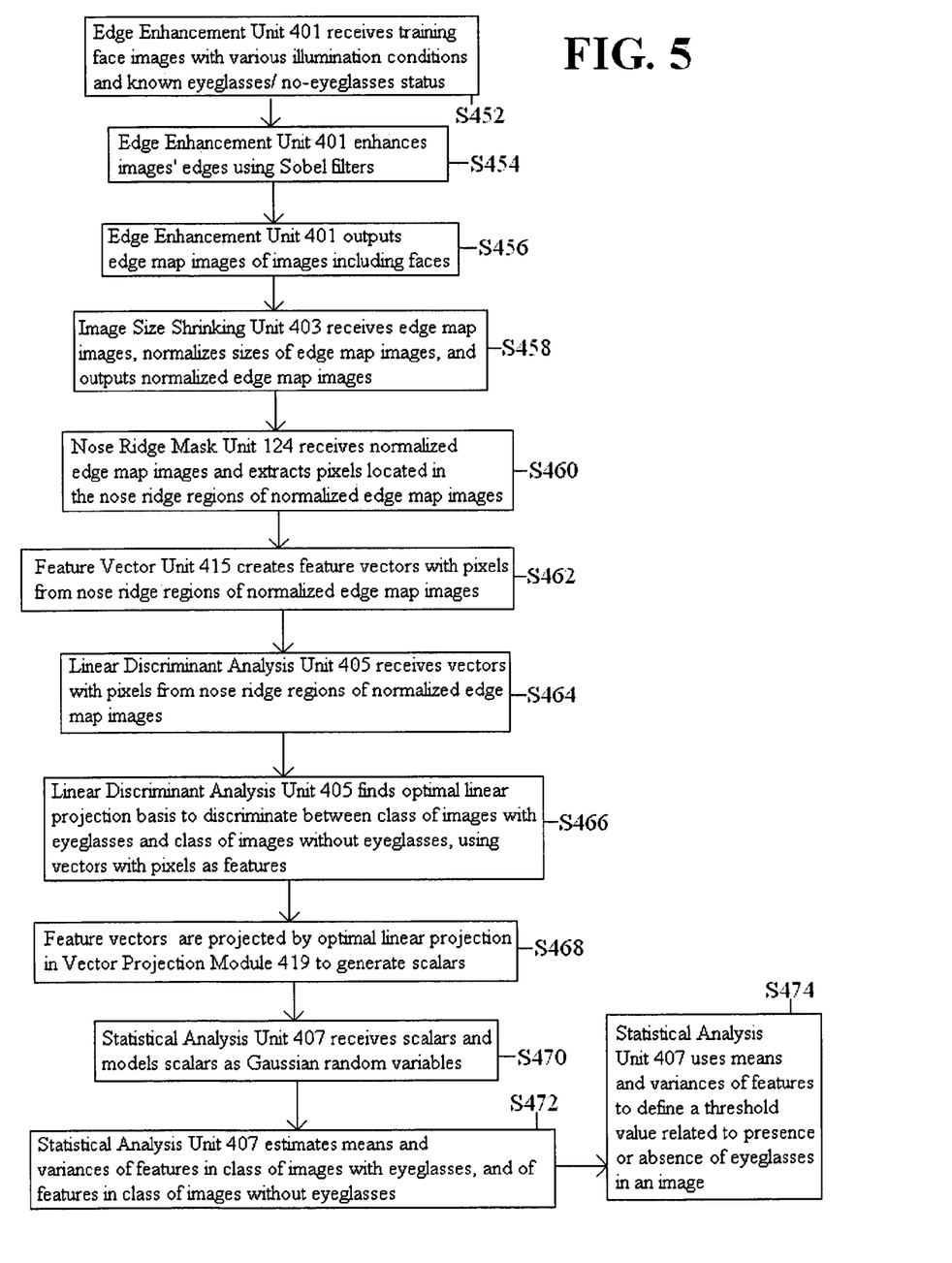
FIG. 5 is a flow diagram illustrating operations for eyeglasses detection learning performed by an image processing unit for automatic eyeglasses detection using a nose ridge mask according to an embodiment of the present invention illustrated in FIG. 4.

FIG. 5 is a flow diagram illustrating operations for eyeglasses detection learning performed by an image processing unit 41 for automatic eyeglasses detection using a nose ridge mask according to an embodiment of the present invention illustrated in FIG. 4. Edge enhancement unit 401 receives training face images with various illumination conditions and known eyeglasses/no-eyeglasses status (S452). Various illumination conditions are used for training images in order to increase the variability of faces on which image processing unit 41 is trained for eyeglasses detection. Illumination conditions include variations in light intensity and in lighting direction. Face images with various illumination conditions can be generated in image input unit 31, by taking digital images of various people under various lighting conditions.

Edge enhancement unit 401 enhances image edges using Sobel filters, which are robust for different input image illuminations (S454). Other filters or edge enhancement techniques can also be used. When using Sobel filters, the input images are filtered by the standard Sobel filter in both horizontal and vertical directions, as shown in the formula below $$I_{edge} = |I_0 * S_h| + |I_0 * S_v| \quad (1)$$

where (*) is the 2-dimensional convolution; $I_0$ is an input image; $I_{edge}$ is the output edge map; $S_h$ and $S_v$ are the horizontal and vertical Sobel filter kernel, respectively. The results are omni-directional edge maps of the original images. In one implementation, the size of $I_0$ is 160×160 pixels. Edge enhancement unit 401 next outputs the edge maps of the training face images (S456). Image size shrinking unit 403 receives the edge map images, normalizes sizes of edge map images, and outputs normalized edge map images (S458). In step S458, the edge map images are shrunken, e.g., to a the size of 80×80 pixels ($I_{shrink}$). The purpose is to reduce dimension. Nose ridge mask unit 124 receives the normalized edge map images and extracts pixels located in the nose ridge regions of the normalized edge map images, using a mask system (S460). Feature vector unit 415 creates feature vectors $x_n$ with pixels from the nose ridge regions (S462). The feature vectors are used in the eyeglasses detection learning process. Feature vector unit 415 sends the feature vectors to linear discriminant analysis unit 405. Linear discriminant analysis is used to find the optimal linear projection basis to discriminate between two classes, i.e., the class of images without eyeglasses ($H_0$) and the class of images with eyeglasses ($H_1$). Since the detection is a two-class classification problem, a single projection basis (b) is generated in the training stage, and scalars ($x = x_n \cdot b$) are produced after the projection, where · is the dot product (S464, S466, S468). To perform step S466, linear discriminant analysis unit 405 may determine a discriminant function associated with the two-class classification problem. In step S468, the feature vectors with pixels from the nose ridge regions are projected in vector projection module 419, by optimal linear projection determined from linear discriminant analysis, to generate scalars. Statistical analysis unit 407 receives the scalars and models the scalars as Gaussian random variables (S470). Statistical analysis unit 407 then uses the scalars to estimate means and variances ($\mu_0$, $\sigma_0^2$) and ($\mu_1$, $\sigma_1^2$) of features in class of images without eyeglasses $H_0$, and class of images with eyeglasses $H_1$ respectively (S472). Statistical analysis unit 407 uses the determined means and variances of features to define a threshold value related to presence or absence of eyeglasses in a face image (S474). Other statistical models can be used as well. This completes the eyeglasses detection learning stage.

Figure 6:
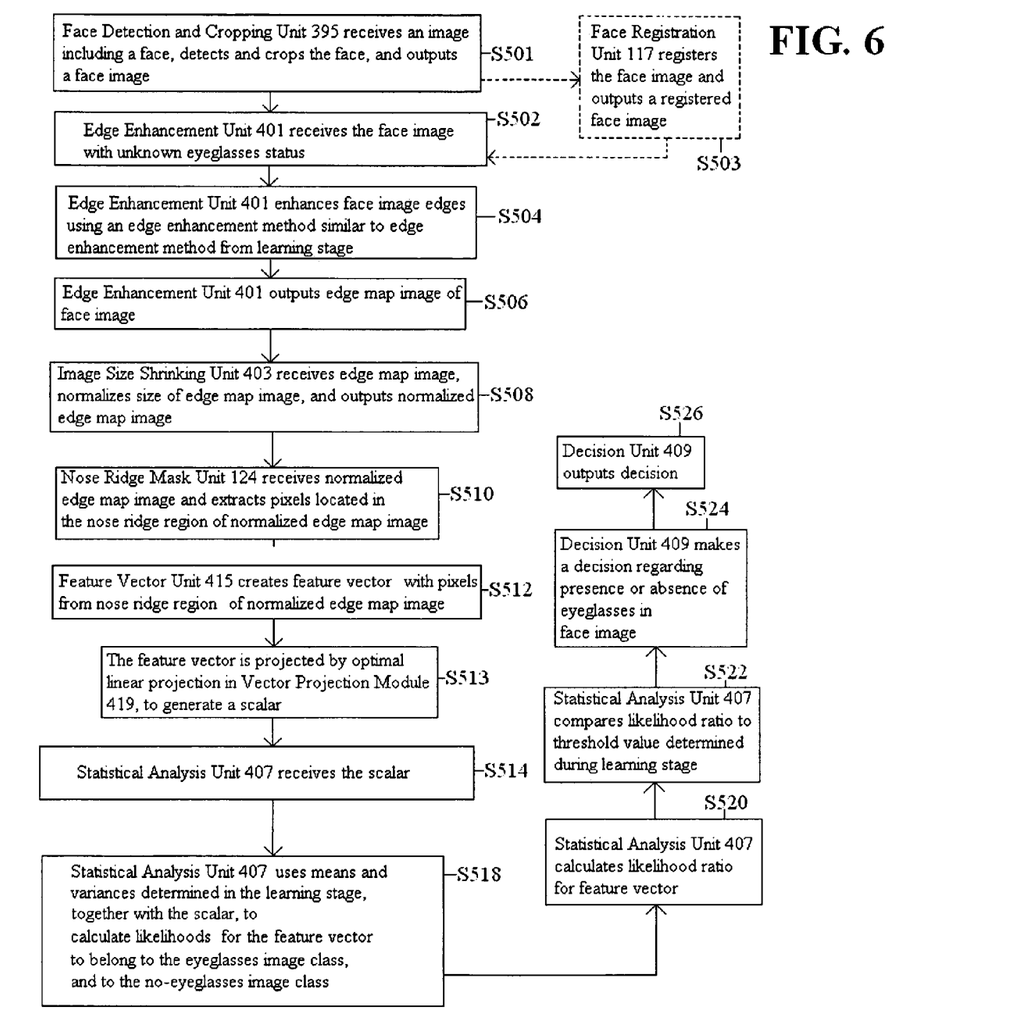
FIG. 6 is a flow diagram illustrating operations for eyeglasses detection performed by an image processing unit for automatic eyeglasses detection using a nose ridge mask according to an embodiment of the present invention illustrated in FIG. 4.

FIG. 6 is a flow diagram illustrating operations for eyeglasses detection performed by an image processing unit 41 for automatic eyeglasses detection using a nose ridge mask according to an embodiment of the present invention illustrated in FIG. 4. Face detection and cropping unit 395 receives an image including a face, detects and crops the face, and outputs a face image (S501). It is not known whether the face image has eyeglasses. If a face registration unit 117 is present, it registers the face image and outputs a registered face image (S503). Edge enhancement unit 401 receives the unregistered or registered face image (S502) and enhances the face image edges using an edge enhancement method consistent with the edge enhancement method used during the learning stage (S504). When using Sobel filters for edge enhancement, the face image is filtered by the standard Sobel filter in both horizontal and vertical directions, as shown in equation (1) that was also used in eyeglasses detection learning:

$$I_{edge} = |I_0 * S_h| + |I_0 * S_v| \quad (1)$$

where $I_0$ is the input image; $I_{edge}$ is the output edge map; $S_h$ and $S_v$ are the horizontal and vertical Sobel filter kernel, respectively. The result is an omni-directional edge map of the original image. In one implementation, the size of $I_0$ is 160×160 pixels. Edge enhancement unit 401 outputs the edge map image of the face image (S506). Image size shrinking unit 403 receives the edge map image, normalizes the size of edge map image, and outputs a normalized edge map image (S508). In step S508, the edge map image is shrunken, e.g., to a size of 80×80 pixels ($I_{shrink}$). The purpose is to reduce dimension. Nose ridge mask unit 124 receives the normalized edge map image and extracts pixels located in the nose ridge region of the normalized edge map image (S510). The size of the nose ridge region is smaller than the size of the face image. Feature vector unit 415 creates a feature vector $x_n$ with pixels from the nose ridge region of the normalized edge map image (S512). The feature vector is then projected by optimal linear projection in vector projection module 419, to generate a scalar (S513). Optimal linear projection is performed using results from the linear discriminant analysis performed during the learning stage. Statistical analysis unit 407 receives the scalar (S514). Statistical analysis unit 407 next calculates likelihoods for the feature vector to belong to the no-eyeglasses image class $H_0$ and to the eyeglasses image class $H_1$ (S518). To calculate likelihoods, statistical analysis unit 407 uses the means and variances ($\mu_0$, $\sigma_0^2$) and ($\mu_1$, $\sigma_1^2$) of features in the class of images without eyeglasses $H_0$, and class of images with eyeglasses $H_1$ respectively, determined in the learning stage. Statistical analysis unit 407 uses the scalar associated with the feature vector of the face image with unknown eyeglasses status, and calculates the likelihood ratio $$\frac{L(x; \mu_0, \sigma_0^2)}{L(x; \mu_1, \sigma_1^2)}$$

for the feature vector (S520). In this ratio, $L(x; \mu_0, \sigma_0^2)$ is the likelihood for the feature vector to belong to the no-eyeglasses image class $H_0$, and $L(x; \mu_1, \sigma_1^2)$ is the likelihood for the feature vector to belong to the eyeglasses image class $H_1$. Statistical analysis unit 407 next compares the likelihood ratio to the threshold value that was determined during the learning stage (S522). If $$\frac{L(x; \mu_0, \sigma_0^2)}{L(x; \mu_1, \sigma_1^2)} > \text{threshold}$$

decision unit 409 decides that the feature vector belongs to the no-eyeglasses class $H_0$. If $$\frac{L(x; \mu_0, \sigma_0^2)}{L(x; \mu_1, \sigma_1^2)} > \text{threshold}$$

decision unit 409 decides that the feature vector belongs to the eyeglasses class $H_1$ (S524). Finally, decision unit 409 outputs the decision regarding absence or presence of eyeglasses in the face image associated with the feature vector (S526). In one implementation, the decision is binary, stating, for example, "yes" when eyeglasses are present, and "no" when no eyeglasses are present.

Figure 7:
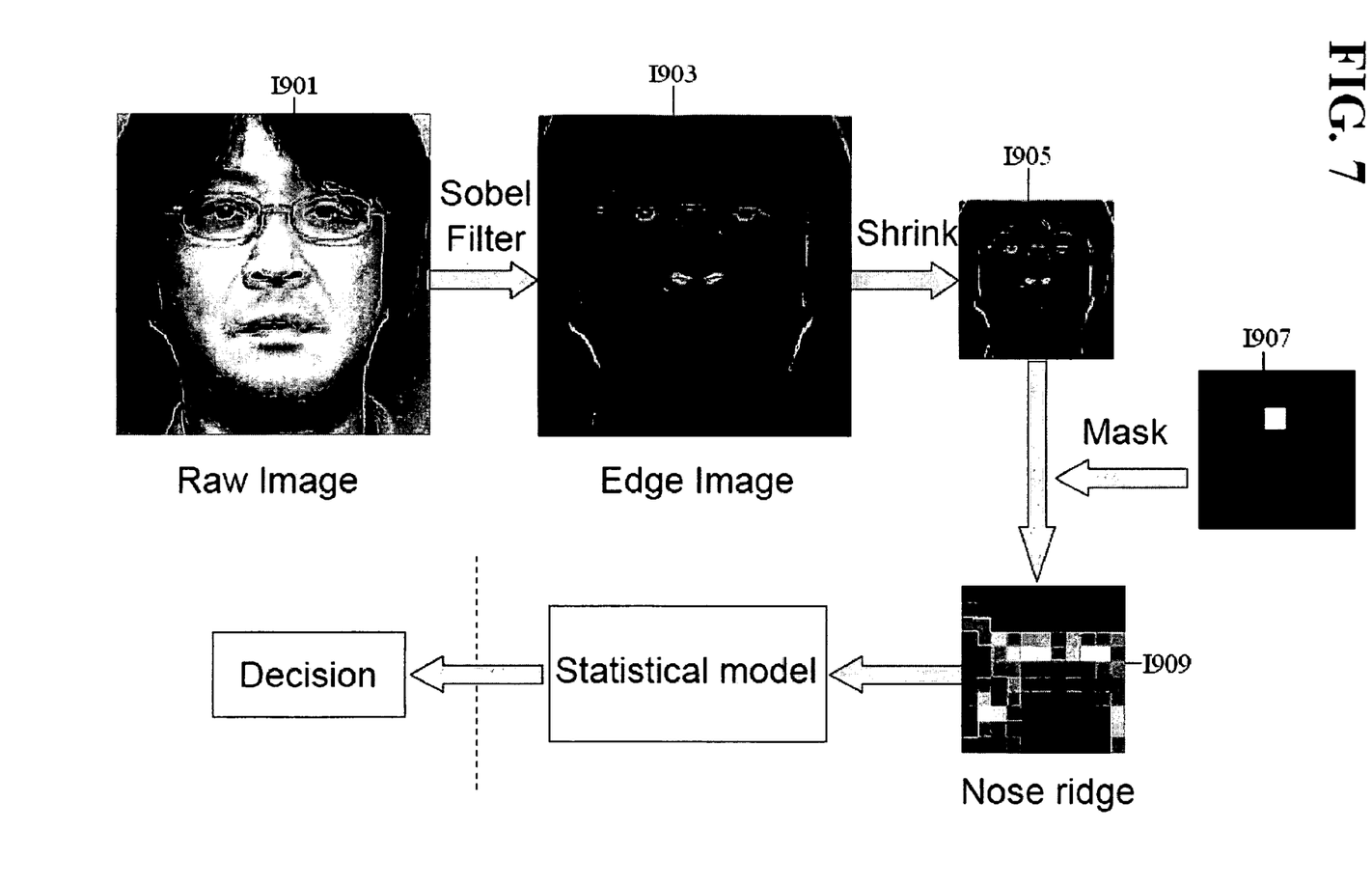
FIG. 7 illustrates exemplary outputs of units included in an exemplary image processing unit for automatic eyeglasses detection using a nose ridge mask according to an embodiment of the present invention illustrated in FIG. 4.

FIG. 7 illustrates exemplary outputs of units included in an exemplary image processing unit 41 for automatic eyeglasses detection using a nose ridge mask according to an embodiment of the present invention illustrated in FIG. 4. A face image 1901 is input into edge enhancement unit 401, which uses a Sobel filter to obtain edge image 1903. Edge image 1903 is sent to image size shrinking unit 403, which shrinks the edge image and outputs a sized edge image 1905. Nose ridge mask unit 124 applies a mask 1907, which selects pixels located in the nose region of the face in image 1905. The nose ridge image 1909 with nose ridge pixels is output from nose ridge mask unit 124. Nose ridge image 1909 is further processed by feature vector unit 415, vector projection module 419, statistical analysis unit 407, and decision unit 409. A report indicating that image 1901 contains eyeglasses is output.

Although detailed embodiments and implementations of the present invention have been described above, it should be apparent that various modifications are possible without departing from the spirit and scope of the present invention.

I claim:

1. A method of automatically detecting eyeglasses in an image by utilizing one or more processors, said method comprising:
   accessing digital image data representing an image including a face;
   extracting, using at least one processor, pixels in a nose ridge region from said image by using a nose ridge mask;
   deciding about presence or absence of eyeglasses in said image based on the extracted pixels in the nose ridge region and statistical parameters obtained in training with pixels in nose ridge regions extracted from face images with eyeglasses and from face images without eyeglasses by using the nose ridge mask; and
   outputting a decision about presence or absence of eyeglasses in said image.

2. The method of automatically detecting eyeglasses in an image by utilizing one or more processors as recited in claim 1, further comprising:
   enhancing edges of said image to create an edge map.

3. The method of automatically detecting eyeglasses in an image by utilizing one or more processors as recited in claim 1, further comprising:
   preprocessing said image by performing face registration of said image including said face.

4. The method of automatically detecting eyeglasses in an image by utilizing one or more processors as recited in claim 1, further comprising:
   training for eyeglasses detection using training images.

5. The method of automatically detecting eyeglasses in an image by utilizing one or more processors as recited in claim 4, wherein said training images are prepared under different illumination conditions.

6. The method of automatically detecting eyeglasses in an image by utilizing one or more processors as recited in claim 5, wherein said illumination conditions include light intensity and lighting direction.

7. The method of automatically detecting eyeglasses in an image by utilizing one or more processors as recited in claim 4, wherein said training images include pairs of images of the same person with and without eyeglasses.

8. The method of automatically detecting eyeglasses in an image by utilizing one or more processors as recited in claim 7, wherein said training step is performed by
   learning to discriminate between a class of images with eyeglasses and a class of images without eyeglasses by using linear discriminant analysis on pixels extracted from nose ridge regions of said training images using said nose ridge mask, and
   estimating statistical parameters including means and variances for said class of images with eyeglasses and for said class of images without eyeglasses.

9. The method of automatically detecting eyeglasses in an image by utilizing one or more processors as recited in claim 8, wherein said step of detecting eyeglasses in said image by using nose ridge masking includes calculating a score based on said statistical parameters estimated during said training step and on pixels extracted from said nose ridge region of said face in said image using said nose ridge mask, and comparing said score to a predetermined threshold.

10. An apparatus for automatically detecting eyeglasses in an image using at least one processor, said apparatus comprising:

an image data unit in said at least one processor, for providing digital image data representing an image including a face;

a nose ridge mask unit in said at least one processor, for extracting pixels in a nose ridge region from said image;

an eyeglasses detection unit in said at least one processor, for deciding about presence or absence of eyeglasses in said image based on the extracted pixels in the nose ridge region and statistical parameters obtained in training with pixels in nose ridge regions extracted from face images with eyeglasses and from face images without eyeglasses by the nose ridge mask unit; and a decision unit in said at least one processor, for outputting a decision about presence or absence of eyeglasses in said image.

11. The apparatus according to claim 10, further comprising:

an edge enhancement unit for enhancing edges of said image to create an edge map.

12. The apparatus according to claim 10, further comprising:

a face registration unit for performing face registration of said image including said face.

13. The apparatus according to claim 10, further comprising:

a training unit for training in eyeglasses detection using training images.

14. The apparatus according to claim 13, wherein said training images used by said training unit are prepared under different illumination conditions.

15. The apparatus according to claim 14, wherein said illumination conditions include light intensity and lighting direction.

16. The apparatus according to claim 13, wherein said training images include pairs of images of the same person with and without eyeglasses.

17. The apparatus according to claim 16, wherein said training unit trains in eyeglasses detection by learning to discriminate between a class of images with eyeglasses and a class of images without eyeglasses by using linear discriminant analysis on pixels extracted from nose ridge regions of faces in said training images using said nose ridge mask, and estimating statistical parameters including means and variances for said class of images with eyeglasses and for said class of images without eyeglasses.

18. The apparatus according to claim 17, wherein said eyeglasses detection unit performs eyeglasses detection by calculating a score using said statistical parameters estimated by said training unit and pixels extracted from said nose ridge region of said face in said image using said nose ridge mask, and comparing said score to a predetermined threshold.

* * * * *